United States Patent [19]
Lynch

[11] Patent Number: 6,055,429
[45] Date of Patent: Apr. 25, 2000

[54] DISTRIBUTED WIRELESS CALL PROCESSING SYSTEM

[76] Inventor: Michael R. Lynch, 2710 Kelvin Ave., Irvine, Calif. 92716

[21] Appl. No.: 08/726,662

[22] Filed: Oct. 7, 1996

[51] Int. Cl.[7] .................................................. H04Q 7/20
[52] U.S. Cl. ........................ 455/445; 455/11.1; 455/518
[58] Field of Search .................................. 370/235, 237, 370/320, 331, 913, 229, 230, 236, 238, 332, 351, 346; 455/445, 456, 466, 550, 11.1, 518, 561, 507

[56] References Cited

U.S. PATENT DOCUMENTS

| | | |
|---|---|---|
| 4,451,699 | 5/1984 | Gruenberg . |
| 5,023,930 | 6/1991 | Leslie . |
| 5,193,162 | 3/1993 | Bordsen et al. . |
| 5,408,679 | 4/1995 | Masuda ................................... 455/11.1 |
| 5,633,876 | 5/1997 | Dinkins . |
| 5,694,393 | 12/1997 | Kaye ........................................ 455/518 |

FOREIGN PATENT DOCUMENTS

WO 94/05101  7/1993  WIPO ............................ H04B 17/00

*Primary Examiner*—William Cumming
*Assistant Examiner*—Linwood C. Scott, Jr.
*Attorney, Agent, or Firm*—Roy A. Ekstrand

[57] ABSTRACT

A distributed wireless call processing system includes a plurality of mobile transceiver units each having the capability to simultaneous receive, reprocess and retransmit a plurality of calls to form a plurality of call paths within the network formed by the units. Within each mobile transceiver unit, a multilevel audit buffer is maintained which is used to store identification and power level data in accordance with a vector ring diagram. The first level of each mobile transceiver unit stores data relating to directly reachable transceiver units. Successive levels of each transceiver's audit buffer store data which has been downloaded upon request from the audit buffers of other transceiver units. The multilevel audit buffering provides for establishment of call vectoring paths between a seeking transceiver unit and a desired transceiver unit.

7 Claims, 5 Drawing Sheets

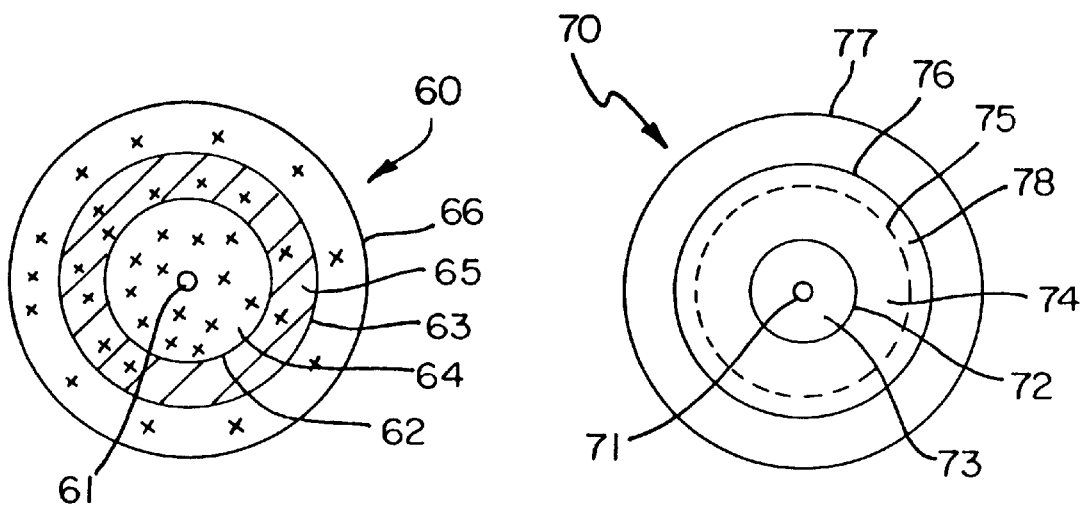
FIG. 2A
FIG. 2B
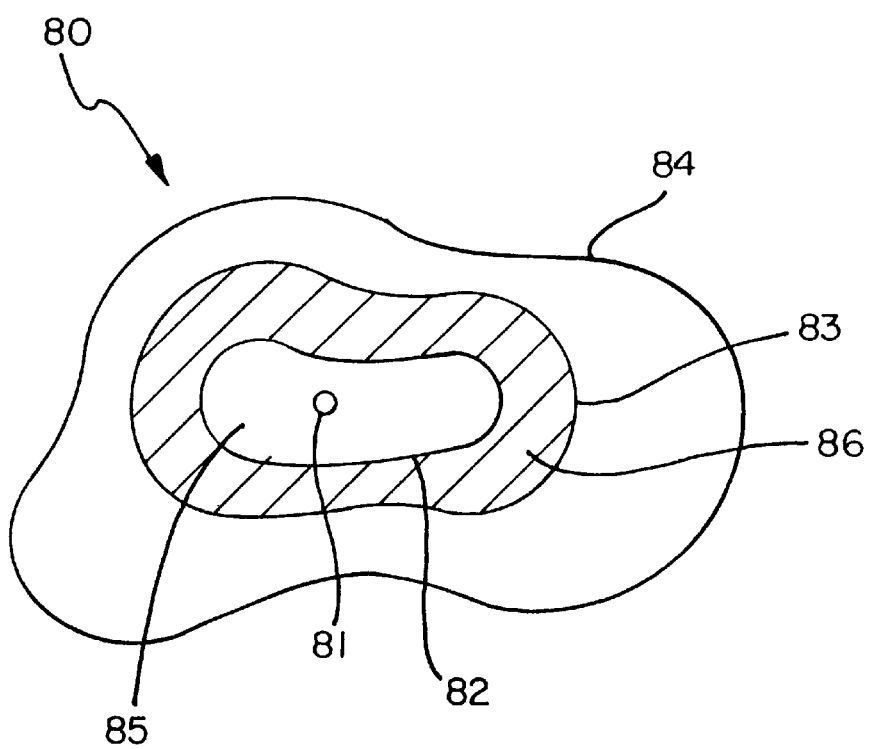
FIG. 2C

DISTRIBUTED WIRELESS CALL PROCESSING SYSTEM

FIELD OF THE INVENTION

This invention relates generally to wireless network systems and particularly to wireless systems known as mobile or cellular phone systems as well as other mobile wireless network systems.

BACKGROUND OF THE INVENTION

Conventional cellular phone systems have enjoyed considerable popularity and growth in recent years. The basic structure of cellular or mobile phone systems presently implemented use a network topology generally referred to as a "star" system. This term arises from the network characteristic in which the plurality of mobile cellular phone units allows all calls to other mobile units or conventional wired phone network units through a central or base facility. In present cellular system technology, a plurality of such base units or cell sites are arranged to provide service to mobile units within their local areas. Thus, for example, a mobile unit is able to communicate with the cell site or base unit within its closest proximity or strongest signal condition as the initial step in establishing communication with other mobile units or through conventional wired phone system networks to virtually any conventional telephone user. While the use of plural cell sites as opposed to a single central facility has greatly enhanced the practicality of cellular mobile phone operation, present day mobile phone systems remain susceptible to poor quality or call interruption or blockage due to various electromagnetic obstacles encountered. In the event an electromagnetic obstacle such as a geographic feature, a substantial building, or other interfering structure is interposed between a mobile unit and the cell site or base unit, service to and from that mobile is rendered impossible. The present cellular phone systems attempt where possible to compensate for such barriers by positioning the plurality of base sites to maximize coverage of a given area of interest.

The vast majority of cellular mobile phone systems in operation utilize analog technology which further limits the effectiveness and reliability of network communication due to the greater susceptibility of interference and greater signal strength required for communication. In addition, conventional cellular phone systems operate using a pair of control channels and a pair of data channels to set up and enable calls between a mobile unit and the central base facility or cell site. The central unit transmits on the forward control channel while the mobile unit responds on the reverse control channel. The central unit or cell site then assigns a pair of data voice channels one for each direction of cellular phone communication. Because these data voice channels utilize different frequencies for transmission, additional problems are created which are particularly acute in weak signal areas. The frequency difference in data/voice channels for each direction results in different transmission characteristics with respect to geographical problems and obstacles. As a result, one unit, either central or mobile, may have clear transmission or reception while the other has weakened or noisy transmission and reception.

Recognizing the limitations of present analog cellular phone systems, practitioners in the art have been attempting to overcome these limitations utilizing various digital communications systems. While a substantial number of such digital communication systems have been suggested, particular promise is shown in systems such as Time Division Multiple Access (TDMA) and Code Division Multiple Access (CDMA). Both TDMA and CDMA are the subject of substantial interest within the United States of America. Within Europe and many other areas, a form of TDMA known as Global System Mobile (GSM) is the subject of substantial interest. The operating parameters and formatting of such digital systems varies substantially. However, all generally attempt to utilize the improved capabilities and flexibilities of digital communication systems in overcoming the limitations of present analog cellular mobile communication.

U.S. patent application (abandoned), which is also the subject of an international publication WO95/11561 filed by Michael R. Lynch and Richard L. Tamplin sets forth a TRANSCEIVER WITH CALL SWITCHING CAPABILITIES IN ARBITRARY NETWORKS having a novel feature which utilizes relay capability between mobile units to extend the network communication coverage. This system substantially improves network topology in that the reliance upon communication directly between each mobile unit and the base or cell site is not necessary for call routing. In the system shown, an originating station or unit is able to communicate with a remote or obstacle impaired unit through one or more relay stations or units. The selection of call routing path is selected so as to minimize transmission power in the event of multiple or alternate paths being available. Despite the improvement provided in the above-described prior art system, there remains a continuing need in the art for evermore improved effective and efficient distributed wireless call processing systems.

SUMMARY OF THE INVENTION

Accordingly, it is a general object of the present invention to provide an improved distributed wireless call processing system. It is a more particular object of the present invention to provide an improved distributed wireless call processing system which avoids the need to communicate with a base or central unit. It is a further object of the present invention to provide an improved distributed wireless call processing system which facilitates communication directly between mobile units and which is able to adjust to and compensate for the density of mobile units within the operating area of each mobile unit.

In accordance with the present invention, there is provided a distributed wireless call processing system having a plurality of multiple channel transceivers each capable of receiving and retransmitting multiple calls. Each transceiver provides for a multilevel audit buffer within which data on location of other units may be stored. The inner level of audit buffer of each transceiver is capable of containing the location data for surrounding units directly reachable by the transceiver. Successive lower audit buffer levels receive the unit location data stored in surrounding units which is downloaded to the transceiver as the transceiver searches for a desired unit.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 2A, 2B and 2C set forth call vector ring diagrams for the present invention distributed wireless call processing system;

DESCRIPTION OF THE PREFERRED EMBODIMENT

Figure 1:
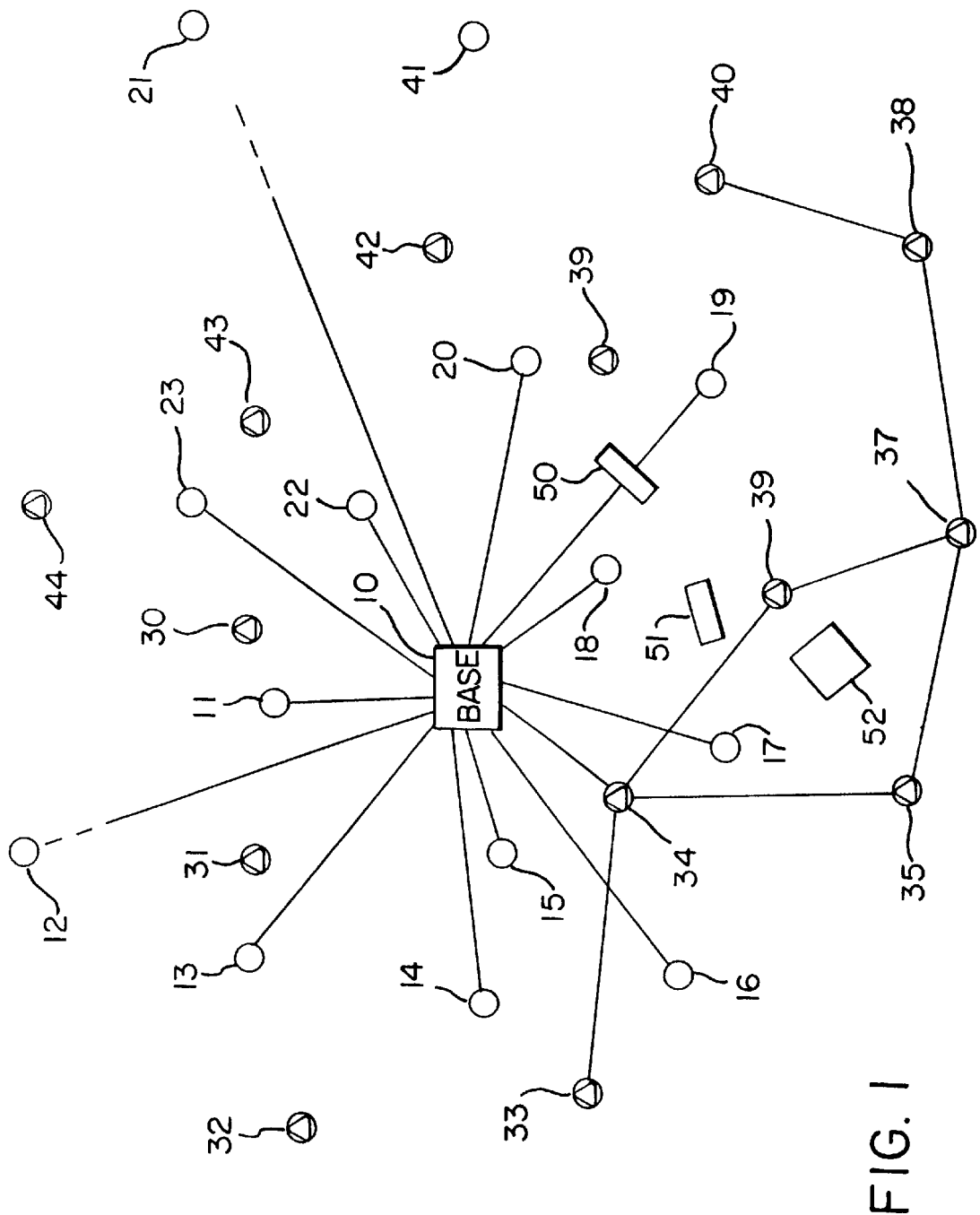
FIG. 1 sets forth an exemplary network configuration utilizing the present invention distributed wireless call processing system.

FIG. 1 sets forth a network diagram of a distributed wireless call processing system operative within the environment of a conventional cellular phone network. The conventional cellular phone network is constructed in accordance with the prior art systems and utilizes a base or cell site 10 having a plurality of mobile units 11 through 23 variously positioned about base unit 10. In further accordance with conventional fabrication and cell site operation, all communication of mobile units 11 through 23 is carried forward in a star topology in which each mobile unit is in communication with base 10 rather than direct communication between mobile units. A plurality of electromagnetic barriers 50, 51 and 52 are shown within the operational region of the network and may, for example, include geographic features such as hills or mountains, electromagnetic structures such as power systems and power lines, interfering transmission or radar systems, or substantial building structures. The important aspect of electromagnetic radiation barriers 50 through 52 is their undesired function in blocking wireless communication therethrough.

In accordance with the present invention, a network of mobile transceiver units fabricated and operating as set forth below is shown operative within the region occupied by the conventional cellular phone system. These mobile transceiver units are indicated as encircled triangular units 30 through 43. It will be apparent to those skilled in the art that while FIG. 1 shows mobile transceiver units 30 through 43 interspersed among conventional cellular phone mobile units, the presence or proximity of a conventional cellular phone system is not required for the operation of the present invention distributed wireless call processing system. On the contrary, while the present invention system is able to interact with a conventional cellular phone system and its units, the present invention system is equally capable of functioning without interaction with or in the presence of a conventional cellular phone system.

In the operation of conventional cellular phone units 11 through 23 and base unit 10, a star type network configuration is utilized in which each unit communicates directly with base 10 and a call path through base 10 to the target or desired phone is configured at base 10. Thus, unit 16 desiring to call unit 20 places a call request which base 10 responds to and assigns a pair of data voice channels in each direction between base 10 and calling unit 16 and base 10 and calling unit 20. The same pattern is observed in the event unit 16 or any other conventional mobile unit desires communication with a conventional land line phone in that unit 16 communicates with base 10 and base 10 places unit 16's call upon a conventional land line interface. The important aspect to be understood in reviewing the prior art cellular phone system comprising base unit 10 and mobile units 11 through 23 is the reliance upon communication through base 10 for all mobile units. In the example shown in FIG. 1, certain problems are presented by this configuration. For example, electromagnetic barrier 50 is interposed between base 10 and unit 19 rendering communication with unit 19 impossible for any mobile unit within the conventional system. Correspondingly, unit 19 is out of communication with all other units and all land line phones due to its inability to communicate with base 10. Similarly, unit 21 is indicated to be somewhat beyond the transmission range of base 10 and thus is also unreachable unless an alternate base unit is nearby. Further, unit 12 is positioned at or near the fringe limit of transmission communication with base 10 and thus again, unless an alternate base unit is nearby, will have difficulty in communicating.

In the present invention system formed by mobile transceiver units 30 through 43, however, the network topology is configured in response to the call placement and as a result is not subject to the limitations of the prior art system. In accordance with an important aspect of the present invention, each mobile transceiver unit is able to communicate directly with any other mobile transceiver unit within its communication range. Thus, considering for example, mobile transceiver unit 34. The options available to mobile transceiver unit 34 include conventional communication with base 10 to place calls to any of the conventional mobile units 11 through 23 as well as communication to conventional land line phones using the standard cellular phone protocol. In addition, however, and in accordance with the present invention, unit 34 is able to directly communicate with units 33, 35 and 36. Thus, unit 34 is able to place a call directly to units 33, 35 or 36 without any use of base 10. In further accordance with the present invention, unit 34 is able to communicate indirectly with unit 37 via units 35 or 36. It should be noted that electromagnetic barrier 52 is interposed between unit 34 and 37 making direct communication impossible. In further addition, unit 34 is able to communicate with unit 38 using a call path which is routed to unit 37 through either unit 35 or 36 and from unit 37 to unit 38.

Thus, the present invention distributed wireless call processing system facilitates communication between a mobile transceiver unit and a desired unit through either a direct communication unit to unit, or through one or more intermediate units which function in a relay-like capacity to form a chain of units referred to herein as a call vector. In accordance with an important aspect of the present invention, the call routing or call vectoring within the present invention distributed wireless call processing system is carried forward with optimum effectiveness and efficiency due to the manner in which the presence and availability of other transceiver units is known to each mobile transceiver unit within the system. Each mobile transceiver unit within the present invention system maintains an audit buffer having a plurality of levels within which the location vector (consisting of direction from the reference transceiver, plus transmission power required to reach the reference transceiver with an adequate signal for communication to various other transceiver units may be stored. The organization of this audit buffer facilitates the call vectoring process to a degree that a given transceiver unit is able to audit surrounding units and store their identifications and power levels within the audit buffer in response to a request and thereafter vector a call without unduly delaying the communication.

Each selected transceiver unit in a search performs an audit of surrounding units and maintains the location of surrounding units in a multilevel buffer. The levels denote the relationship within the network between the transceiver unit and other units. Thus, the first buffer level is dedicated to data obtained by auditing surrounding units and identifying those units with which direct communication is achievable. As a result, the first level buffers of each transceiver unit within the system store data for all directly reachable transceiver units. Succeeding levels of audit buffer are dedicated to information obtained from other transceiver unit audit buffers and are placed one level down within the auditing transceiver units buffer. This process is perhaps best understood by considering an example within FIG. 1. Selecting unit 34 as an exemplary unit, unit 34 performs an audit of surrounding units by initially determining those units with which direct communication may be obtained. In the example of unit 34, units 33, 35 and 36 are directly reachable and thus the first level of the audit buffer for unit 34 includes the identification and power data for units 33, 35 and 36. In constructing the second level of its audit buffer, unit 34 then requests the first level data from the audit buffers of units 33, 35 and 36. In the example shown, unit 33 includes the data on unit 32 in its first level buffer. Similarly, unit 35 includes the data on unit 37 and 34 while unit 36 includes the data on units 37 and 34. As a result, the second level of the audit buffer of unit 34 includes the identifications and power levels of units 32 and 37. It should be noted that for optimum efficiency as described below, redundant information is removed prior to storage within the audit buffer. Thus, unit 34 stores the data for directly reachable units 33, 35 and 36 within its first level audit buffer and stores the first level audit buffer data from each of units 33, 35 and 36 within its second level buffer. Since each unit within the system is also performing an audit and storing second level data within its respective audit buffer this second level data when communicated to unit 34 is stored in the third buffer level of the audit buffer of unit 34. In the example shown, unit 37 includes the data for unit 38 within its first level buffer. This data is stored within the second level buffers of units 35 and 36. This second level data of units 35 and 36 is then stored within the third level of the audit buffer of unit 34. In the examples described below, a three level buffer organization is often utilized. However, it will be apparent to those skilled in the art that subject only to buffer capacity and the Shannon Limit, virtually any number of buffer levels may be established for each audit buffer of each transceiver unit within the present invention distributed wireless call processing system.

Following the three level audit example for unit 34 described above, an examination of the first three levels of audit buffer for unit 34 shows that the first level includes locational data for units 33, 35 and 36. The second buffer level holds locational data for unit 37 and unit 32. The third buffer level holds locational data for unit 38 and unit 31. The use of this multilevel buffer organization for each transceiver's audit buffer facilitates rapid and efficient call vectoring throughout the entire network. For example, in the event unit 34 receives a request or query for communication with unit 35, examination of the first level of its audit buffer determines that direct communication is possible. In response to query for communication with unit 37, unit 34 upon searching its first level of audit buffer and not finding unit 37 then searches it second level. Unit 37 is found in its second level of audit buffer and the combination of first and second level data is utilized in vectoring a call through unit 34 to unit 37 via unit 35. It will be understood that unit 35 is performing in a similar manner when it receives a query from unit 34. By way of further example, in response to a call request for unit 38, unit 34 searches its first and second level buffers without finding unit 38 but finds unit 38 in its third level buffer. Once again, the data within the third, second and first levels of unit 34's audit buffer is then utilized to vector a call from unit 34 through units 35 and 37 to unit 38.

It will also be noted that in the above example an alternative path is available through unit 36 rather than unit 35. In the present invention system, the alternative paths, in this case through either unit 35 or 36, are evaluated with respect to power required and a selection is made. The nonselected path is stored as an alternative path to be switched to in the event of interruption of the primary vectored call path.

Thus, within the present invention system, as each mobile transceiver unit structures its respective audit buffer by receiving downloaded audit buffered data from surrounding transceiver units, the location of virtually any transceiver unit within the system may be readily determined and a call effectively vectored through a plurality of units to reach the desired unit. In some situations, it may be desirable to have each transceiver unit configured to periodically perform an updated audit of surrounding units and periodically update its audit buffer information in anticipation of call requests. However, it has been found that in most situations, the speed of response of the mobile transceiver units in downloading data to other units and structuring their audit buffers is sufficient to perform this audit buffer operation at the time a call request is received.

In further accordance with the present invention, the number of transceiver units from which audit buffer data is downloaded is controlled by establishing a limitation of downloading units based upon transmitting power levels using a vector ring which is illustrated in FIGS. 2A through 2C.

Accordingly, FIGS. 2A through 2C set forth examples of the vector ring operation of the present invention distributed wireless call processing system. By way of overview, it is important to note that the examples shown in FIGS. 2A through 2C are shown spatially for purposes of understanding an illustration. However, the various boundaries and configurations illustrated are in fact not spatial but rather represent various distributions of transmitting power requirements.

More specifically, FIG. 2A sets forth a vector ring diagram generally referenced by numeral 60. Diagram 60 is shown as a plurality of concentric circles for purposes of illustration. However, in an actual operation environment, various power level boundaries of irregular shape such as those shown in FIG. 2C are more likely to occur. However, concentric circles shown in FIGS. 2A and 2B are helpful for explanation. Thus, in FIG. 2A, diagram 60 shows a mobile unit 61 having a first boundary level 62 which defines an area of direct communication 64 therein. Diagram 60 further shows a second boundary level 63 and an outer boundary level, 66. Boundary level 63 corresponds to the maximum transmission power level which mobile unit 61 may effectively rely upon for reliable continuous communication. Thus, a vector ring 65 is formed between boundary levels 62 and 63. For purposes of further illustration and reference, a maximum power range 66 is shown encircling vector ring 65 and spaced therefrom. The portion of diagram 60 between boundary level 63 and maximum range 66 is a border line power requirement (maximum power required) and thus is not reliable for effective communication. For purposes of further illustration, a plurality of transceiver units represented by small X's is randomly distributed within diagram 60.

In the illustration of diagram 60, the area bounded by boundary layer 63 surrounding mobile unit 61 forms the area of direct communication 64 and 65. Correspondingly, mobile units found within this direct communication area are capable of being reached by mobile unit 61 in a direct communication as described above. Units within vector ring 65, so-called because it establishes the mobile units through which calls may be vectored to the desired unit, are far enough from unit 61 so that their audit buffers will not include an excessive number of units also seen by unit 61 but will also include a maximally large number of units not seen by unit 61. Thus, vector ring 65 contains the mobile transceiver units which are called upon by mobile unit 61 for downloading of their respective audit buffers in the above-described multilevel audit buffer configuration.

In auditing surrounding units and structuring its audit buffer, mobile unit 61 would place data for all mobile transceiver units within direct communication regions 64 and 65 in its first level buffer. Additionally, units within vector ring 65 would download their respective first level buffer data to mobile unit 61 for storage within the second level of data buffer for mobile unit 61. In addition, as required for a search, the selected units within the vector ring 65 would also contain audit buffers, each of which would include its own vector ring. The audit buffers extended from each selected mobile unit in these vector rings would be downloaded to unit 61 for placement within the third buffer level of mobile unit 61. Selection of units within a vector ring for this process is accomplished as follows. The mobile units have access to position and direction information relative to each other, making it possible to select four units at about 90° relative to each other and so minimize redundancies of terms (i.e., overlap).

As mentioned above, the present invention mobile transceiver units control the number of units for which data is stored within their audit buffers by selecting the configuration of their respective vector rings. More specifically, the configuration of vector ring 65 in the example of FIG. 2A is selected to control the number of units to be placed within the second buffer level of mobile unit 61. This determination is made primarily on the basis of unit density data which is obtained in auditing the first level audit buffer data of mobile unit 61. Thus, mobile unit 61 evaluates the number of units within direct communication areas 64 and 65 and computes a unit density. In urban areas, for example, unit density is substantially greater than rural areas and thus the number of units responding to mobile unit 61 in its initial audit buffer inquiry varies correspondingly. As a practical matter, the number of units to be found within vector ring 65 is controlled by selecting the effective radius of boundary layer 62 while maintaining the effective radius of boundary layer 63 as indicated. This is a result of the determination that boundary layer 63 is established as an indication of the expense of power requirement for reliable communication.

FIG. 2B sets forth a vector ring diagram generally referenced by numeral 70. Diagram 70 is concentrically arranged about a mobile unit 71 having a direct communication region including the vector ring and bounded by circle 76. Once again an outer power level 77 is shown which represents maximum transmission power range for mobile unit 71. In the configuration of diagram 70 represented by vector ring 74 formed between boundary levels 72 and 76, the vector ring size has been increased to respond to low unit density such as a rural area. In the event mobile unit 71 moves to a high density environment such as an urban area, the boundary between direct communication area 73 and vector ring 74 is moved outwardly to dashed-line boundary 75. This adjustment results in a smaller vector ring 78 and a correspondingly smaller number of transceiver units in comparison to the size of vector ring 74. In this manner, the transceiver units of the present invention distributed wireless call processing systems are able to control the number of units within their second and third buffer levels to suit density and maintain a practical operation.

FIG. 2C shows a vector ring diagram generally referenced by numeral 80 having an irregular shape which more typically corresponds to the operating environment encountered by transceiver units. The irregularity of diagram 80 is likely to result from the proximity of various transmission limitations around unit 81 such as geographical features or urban building structures or the like. Thus, surrounding unit 81 is an irregularly shaped vector ring 86 formed by irregular boundaries 82 and 83 and an outer maximum power range indicated by boundary 84. In all other respects, diagram 80 is operated in the same manner as FIGS. 2A and 2B shown above.

Figure 3:
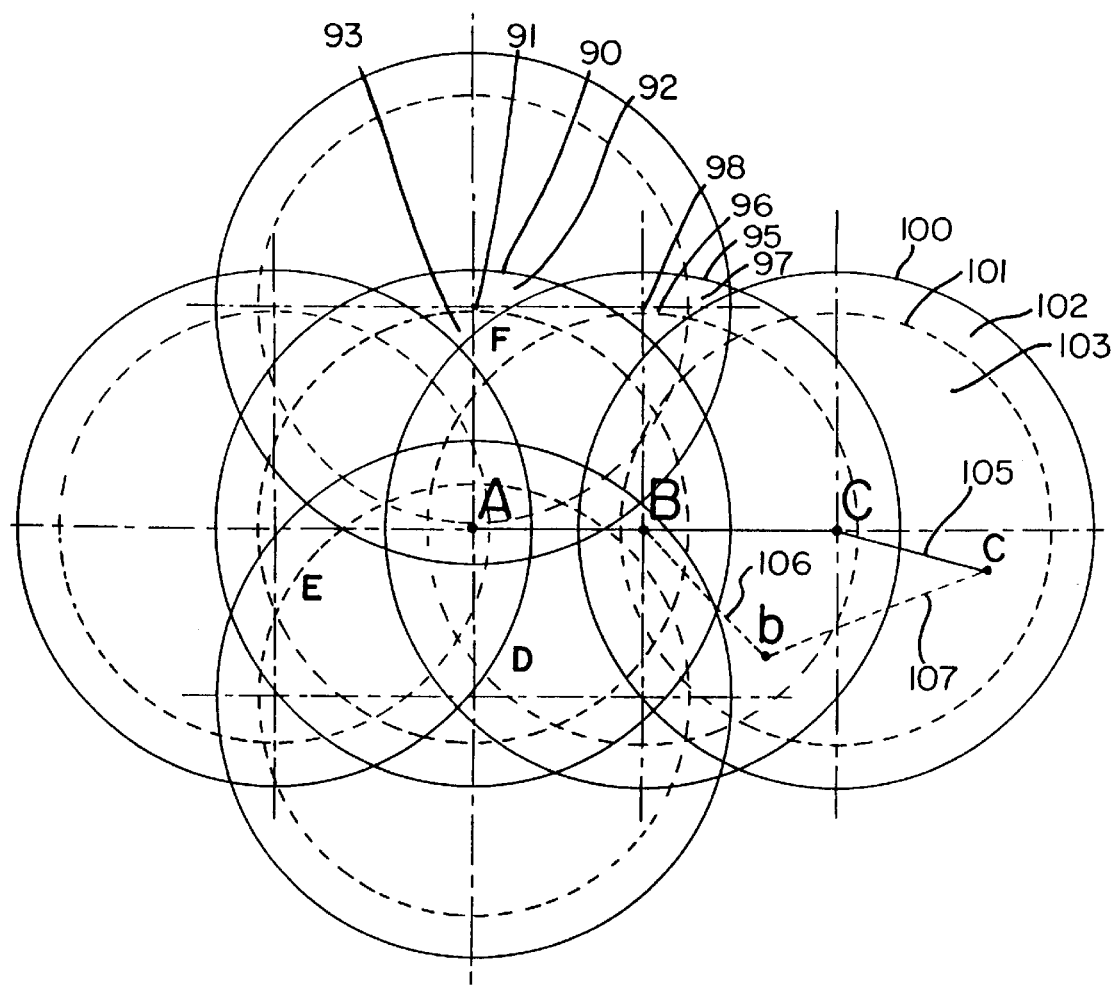
FIG. 3 sets forth a call vector diagram of five overlapping mobile units operative in accordance with the present invention distributed wireless call processing system.

FIG. 3 sets forth an idealized vector ring diagram set for a trio of mobile transceiver units. The purpose of FIG. 3 is to illustrate the overlapping nature of vector ring diagrams for transceiver units in proximity. Thus, in FIG. 3, a trio of mobile units A, B and C are proximally located within the above-described distributed wireless call processing system network. For example, up to twenty miles line-of-sight separation may be provided between units in a modern GDMA system. Again, for purposes of simplicity, circular vector ring diagrams are utilized. However, it will be remembered that a practical vector ring diagram will most likely be irregularly shaped due to transmission irregularities and obstacles. Mobile unit A defines a vector ring diagram bounded by power level boundaries 90 and 91 and generally referenced by numeral 92. The region within power level boundary 91 defines an inner buffer level or direct communication region 93. Correspondingly, mobile unit B defines a vector ring diagram having an outer boundary 95 and an inner boundary 96 between which a vector ring 97 is defined. Within boundary 96, an inner boundary level or direct communication region 98 is defined for mobile unit B. Finally, mobile unit C defines a vector ring diagram having an outer boundary 100 and an inner boundary 101 defining a vector ring 102 therebetween. Region 103 within boundary 101 defines the direct communication or inner buffer level 103 for mobile unit C. Additionally, surrounding mobile units D, E and F define similar vector rings which are shown to complete the environment for mobile unit A. Also shown in FIG. 3 are additional mobile units b and c.

Considering for the moment the location of mobile unit c, it will be noted that mobile unit c will be found within the inner audit buffer of mobile unit C. Additionally, the contents of C's inner audit buffer are located within the second level audit buffer of mobile unit B. Finally, mobile unit c is located within the third level buffer of mobile unit A.

Thus, in this example, assuming mobile unit A originates a call seeking mobile unit c, mobile unit A locates mobile unit c within its third level buffer. It will be recalled that the third level buffer of mobile unit A includes the inner audit buffer of mobile unit C. Further, it will be recalled that the contents of C's inner audit buffer are in the second level audit buffer of mobile unit B. Thus, mobile unit A routes the call to mobile unit C via mobile unit B with a request to C to vector the call to mobile unit c. It will be apparent to those skilled in the art that in a practical operating environment, a substantial number of redundant terms will be caused in the initial audit process due to the high degree of overlap of the vector rings of the mobile transceiver units. These redundant terms are eliminated from the audit buffers. In addition, several alternate paths such as ABCc or ABbc may be established which are used to provide alternate available paths to ensure call continuity in a mobile environment. The resulting characteristic of the present invention distributed wireless call processing system provides multilevel concatenated call vectors as each mobile transceiver unit performs the above-described multilevel audit buffering configuration.

Figure 4:
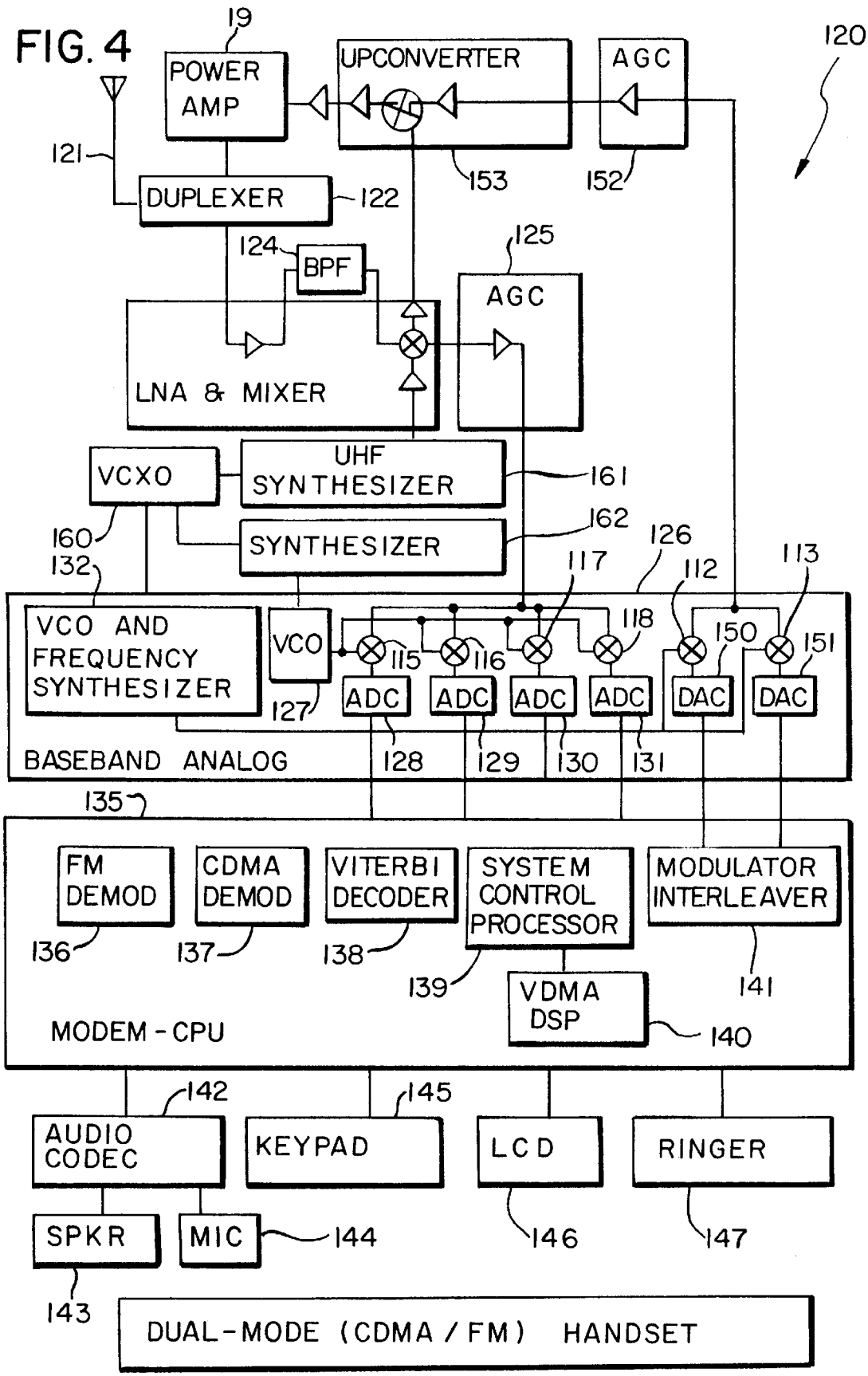
FIG. 4 sets forth a block diagram of a typical CDMA digital wireless transceiver constructed in accordance with the present invention and operative within the present invention distributed wireless call processing system.

FIG. 4 sets forth a block diagram of an exemplary mobile transceiver unit of the digital CDMA type constructed in accordance with the present invention and operative within the present invention distributed wireless call processing system. The mobile transceiver unit of the present invention generally referenced by numeral 120 includes an antenna 121 coupled to a duplexer 122. Duplexer 122 operates to toggle antenna 121 between a low noise amplifier and mixer 123 on the receiver portion of transceiver 120 and the output of a power amplifier 154 operative in the transmitter part of transceiver 120. Low noise amplifier and mixer 123 includes a bandpass filter 124 and is operative to frequency convert the received signal to an intermediate frequency signal which is coupled by an automatic gain control system 125 to a quartet of synchronous detectors 115 through 118. Detectors 115 through 118 are coupled to a voltage controlled oscillator 126 and are operative to recover the baseband analog signal from the input intermediate frequency signal provided by amplifier 125. Each of detectors 115 through 118 is coupled to an analog to digital converter 128 through 131 respectively. The output signals of converters 128 through 131 form four identical fingers allowing transceiver 122 to simultaneously receive several multipath signals and coherently combine them. Each channel output of converters 128 through 131 is coupled to a modem/central processing unit 135. Within unit 135, several system demodulators and decoders are provided to accommodate three alternative system formats. Thus, modem/central processing unit 135 includes an FM demodulator 136 for analog transmissions, a CDMA demodulator 137, a viterbi decoder 138 for forward error correction, and a system control processor 139. Also included within modem/central processing unit 135 is a VDMA digital signal processor 140 which processes up to four simultaneous VDMA channels in a separate band in a manner to be described in a separate disclosure document. Transceiver unit 120 also includes an audio codec 142 having a speaker 143 and a microphone 144 to facilitate audio voice communication. Further, transceiver unit 120 includes a conventional keypad input 145 and a display unit 146. In its preferred form, display 146 may include an LCD or LED display of conventional fabrication. Finally, a conventional ringer unit 147 is operatively coupled to modem/central processing unit 135.

Within the transmission portion of transceiver 120, a modulator interleaver 141 provides a dual channel output which is coupled to a pair of digital to analog converters 150 and 151. Converters 150 and 151 are coupled to a pair of mixers 112 and 113 each of which receives an input oscillator signal from a voltage control oscillator and frequency synthesizer 132. It should be noted that while oscillator 132 is shown commonly coupled to mixers 112 and 113, in operation, each of mixers 112 and 113 is operated in response to a different synthesized frequency to provide frequency interleaving of the output signal. The output signals of mixers 112 and 113 is coupled to an up converter 153 through an automatic gain control amplifier 152. Within up converter 153, the to-be-transmitted signal is up converted to a desired transmission frequency and applied to antenna 21 through power amplifier 154 and duplexer 122.

Figure 5:
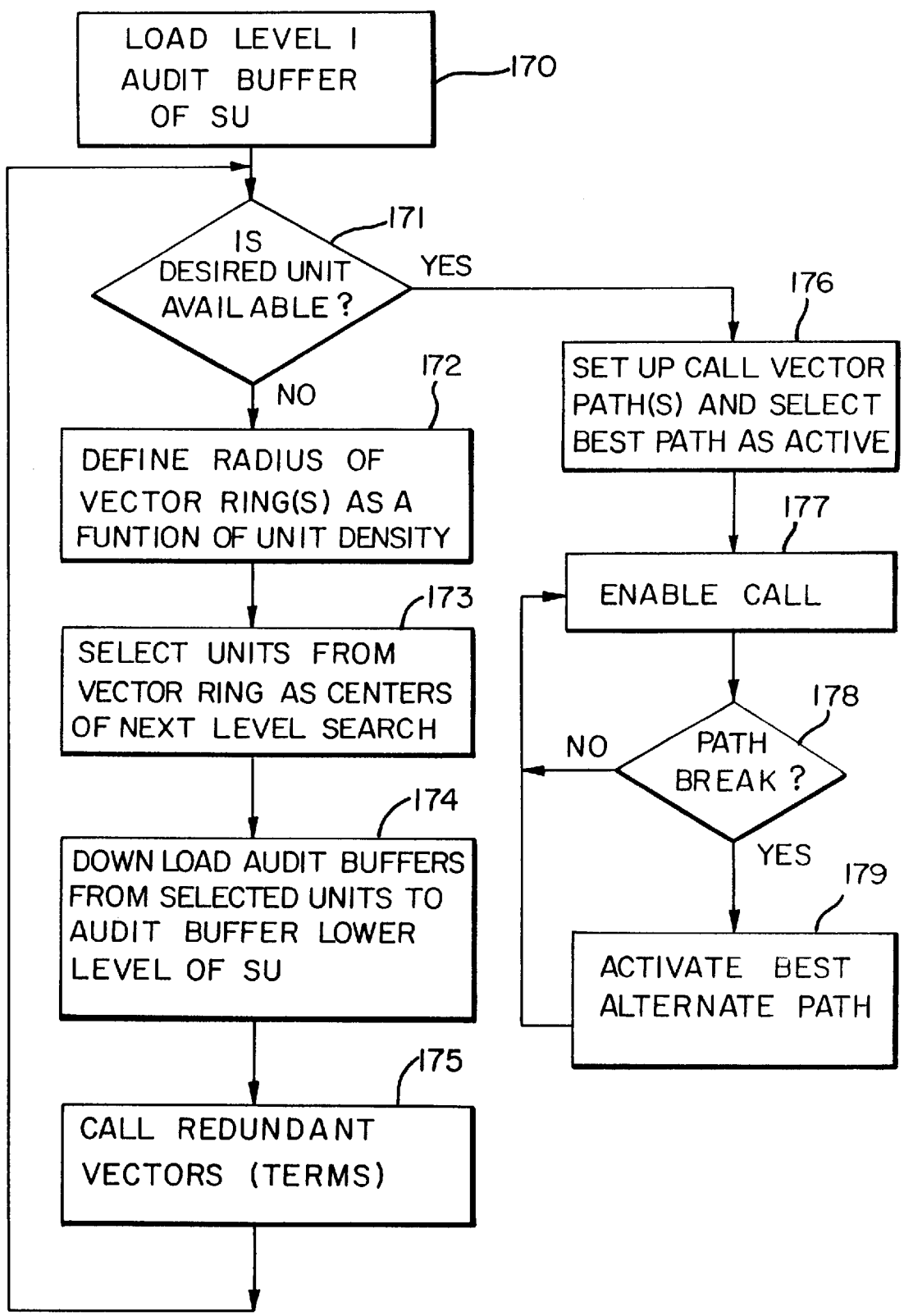
FIG. 5 sets forth a flow diagram illustrating the operation of the transceiver of FIG. 4.

FIG. 5 sets forth a flow diagram illustrating the operation of the present invention mobile transceiver unit operating within the present invention distributed wireless call processing system. More particularly, the flow diagram of FIG. 5 sets forth the operation of a mobile transceiver unit constructed in accordance with the present invention during operation in response to a request or call placement to the mobile transceiver unit for locating a desired unit within the present invention distributed wireless call processing system. Thus, in response to a call placement, call origination or request for unit location, the present invention transceiver commences the search operation at step 170 by loading the transceiver units level one audit buffer with data pertaining to each transceiver unit with which direct communication is obtainable. At step 171, a determination is made as to whether the desired unit is available within the level one buffer. In the event the desired unit is available, the system moves to step 176 and sets up one or more call vector paths available and selects the best path available to be designated active path. It should be noted that alternative paths not selected as active are nonetheless stored in temporary buffer memory to available in the event of call switching needs to maintain continuity. Thereafter, the system moves to step 177 and enables the call. At step 178, a continuous monitoring process is provided in which examination is made for a path break. Such a path break may, for example, occur as a mobile unit moves behind an electromagnetic obstacle. So long as no path break is determined at step 178, the system returns to step 177 enabling the call. In the event, however, a path break is detected at step 178, the system then moves to step 179 and activates the best alternate path thereafter returning to step 177 to enable the call over the alternate path.

Returning to step 177, in the event the desired unit is not available within level one of the transceiver unit's audit buffer, the system then moves to step 172 in which a unit density is determined based upon the number of units loaded into the level one audit buffer at step 170. In addition, at step 172, the radius of the vector ring for the transceiver unit is defined as a function of unit density. Thereafter, at step 173, units are selected from the vector ring as centers of the next level search. At step 174, the audit buffers from the selected units are downloaded to the audit buffer of the transceiver unit and stored within the lower levels of the audit buffer in the manner described above. It will be recalled that each downloaded level of audit buffer from a selected unit is stored at the next lower level of audit buffer within the call originating transceiver unit. At step 175, redundant call vectors and/or terms of the vector downloads are removed and the system returns to step 171. At step 171, a determination is again undertaken to find the desired unit. In the event the desired unit is now available following the download of audit buffers from selected units, the system moves to steps 176 through 179 in the above-described call enabling and placement process. If, however, the desired unit is still not available, the system again cycles through steps 172 through 175 to download the next level of audit buffers from selected units within the vector ring and again returns to step 171 searching for the desired unit in the newly downloading buffers. This process continues until the desired unit is found within the transceiver's audit buffer. Once the desired unit is found within the transceiver audit buffer, the system moves to steps 176 through 179 and enables the call. It will be recalled from the above-described operation that the process of setting up call vector paths and selection of best path available at step 176 is carried forward utilizing the successive buffer level data within the transceiver's audit buffers. In effect, the plural and progressive arrangement of audit buffer levels and the manner in which in which they are established in the audit provides the necessary information for establishing and selecting the best vector path. Suffice it to note that each entry within the audit buffer for a transceiver unit includes the identifying number of the transceiver and the power level required to reach it.

What has been shown is a novel distributed wireless call processing system and transceiver for use therein which operates in accordance with a novel multilevel audit buffering system and vector ring call vectoring process to provide communication throughout the network of the wireless call processing system which is routed and maintained without the need for a central or base site unit. The system utilizes a process in which surrounding transceiver units are caused to download their respective audit buffers at each level to progressively establish the audit buffer level of the inquiring transceiver unit. This process of multilevel audit buffering sets up a virtually unlimited ability for the present invention system to concatenate call vectors between elongated "chains" of transceiver units to locate a desired transceiver within the network. Once the multilevel audit buffer information has been downloaded to a requesting transceiver and the desired unit is found within the audit buffer, the multilevel data within the audit buffer greatly facilitates the establishment of the call vector path between units which will provide reliable and effective communication. The present invention system is capable of operation in a variety of wireless communication formats and is not limited to any particular system.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A distributed wireless call processing system comprising:

a plurality of wireless communication transceivers each of said transceivers being operative as a virtual cell site and is able to relay calls between other transceivers within the system;

a plurality of audit buffers within said wireless transceivers;

means for auditing within each of said transceivers to store first level data within said audit buffers identifying directly communicatable transceivers; and means for downloading said audit buffers between at least some of said transceivers, said plurality of audit buffers each being organized to define a first level for said first level data of one of said transceivers and a second level for said downloaded audit buffers of said at least some of said transceivers and each of said transceivers using its second level buffer for locating transceivers not found in its first level buffer and wherein no base or central unit is required and each transceiver is able to communicate with other transceivers using direct call placement or relay call routing through said transceivers.

2. A distributed wireless call processing system as set forth in claim 1 wherein said transceivers each include means for minimizing the amount of transceiver data stored in its audit buffer.

3. A distributed wireless call processing system as set forth in claim 2 wherein said means for minimizing includes means for establishing a first power level within which other transceivers are defined in said first level and for establishing a second power level, greater than said first power level, within which other transceivers are defined in said second level.

4. A distributed wireless call processing system as set forth in claim 3 wherein alternative call paths between said transceivers are determined and a primary call path and alternate call paths are selected therefrom.

5. For use in a distributed plurality of wireless transceivers, a method of call processing comprising the steps of:

performing a first level audit within each of said wireless transceivers and storing first level data identifying other wireless transceivers with which direct communication is available;

defining a vector ring as a function of transceiver density within said first level;

selecting transceivers within said vector ring as centers of a second level search;

downloading said first level data from each of said selected transceivers and storing said downloaded data as second level data; and culling redundant data from said second level data.

6. The method of claim 5 further including the step of minimizing the number of transceivers within said second level by redefining said vector ring.

7. The method of claim 6 further including the step of repeating said steps of defining, selecting, downloading and culling to establish successively lower order data levels.

* * * * *